Feb. 17, 1970  W. E. HUMPHREY  3,495,638
METHOD AND APPARATUS FOR TEXTURING WOOD SURFACES
Filed Sept. 10, 1965  2 Sheets-Sheet 2

INVENTOR.
WAYNE E. HUMPHREY
BY Lyon & Lyon
ATTORNEYS

Feb. 17, 1970 W. E. HUMPHREY 3,495,638
METHOD AND APPARATUS FOR TEXTURING WOOD SURFACES
Filed Sept. 10, 1965 2 Sheets-Sheet 1

INVENTOR.
WAYNE E. HUMPHREY
BY Lyon & Lyon
ATTORNEYS

United States Patent Office 3,495,638
Patented Feb. 17, 1970

3,495,638
METHOD AND APPARATUS FOR TEXTURING WOOD SURFACES
Wayne E. Humphrey, 110 Clovercrest Drive,
Cloverdale, Calif. 95425
Filed Sept. 10, 1965, Ser. No. 486,318
Int. Cl. B27c 5/00; B27b 23/00
U.S. Cl. 144—326                     5 Claims

ABSTRACT OF THE DISCLOSURE

There is disclosed herein a method and apparatus for providing various decorative or textured surfaces on a material, such as wood. One or more cutting assemblies are used to cut the surface of the material at an angle transverse to the relative motion between the direction of feed and movement of the cutting assembly. Each cutting assembly includes a motor driving a chain. The chain is relatively wide so that flexing thereof in the direction of material feed is limited and has cutters affixed to the surface thereof, the surface serving to limit the depth of cut.

---

This invention relates to a method and apparatus for providing a decorative surface and more particularly to a method and apparatus for providing a decorative or textured finish to the surface of a material, such as, a wooden panel.

Various apparatus and processes have been proposed over the years for forming decorative surfaces on material, such as wood, and have met with considerable success. Among these are means for embossing the surface of the material, means for lightly sawing only a portion of the surface of a panel, etc. Some apparatus of this nature have suffered from certain difficulties, among which is the lack in ease of readily providing certain textures, and variations therein, on the surface of material.

Accordingly, it is an object of the present invention to provide an improved method of forming a decorative pattern on a material.

It is a further object of this invention to provide improved apparatus for forming a decorative surface on a material.

It is an additional object of the present invention to provide an apparatus for forming various decorative or textured surfaces on panels.

An additional object of the present invention is the provision of a selectively adjustable apparatus for forming various decorative or textured patterns on the surface of a material.

In accordance with an exemplary embodiment of the teachings of the present invention, a method and apparatus for providing various decorative or textured surfaces on a material, such as wood, is provided and includes a plurality of cutting means each having a substantially linear cutting path. The cutting means may be suitably supported in various aligned or unaligned arrangements, and are adapted to engage the surface of the material and form, by cutting, many different patterns thereon. Preferably, a plurality of the cutting means are mounted on a platform, and means are provided for moving the material substantially transverse to the longitudinal axes of the cutting paths of the cutting means. The under surface of the material, the top surface of which is being decorated, may be supported by plurality of rollers which are pneumatically resiliently mounted with respect to a supporting frame.

Other objects and features of this invention will become more apparent through a detailed consideration of the following description taken in conjunction with the accompanying drawings in which.

Figures 1, 2:
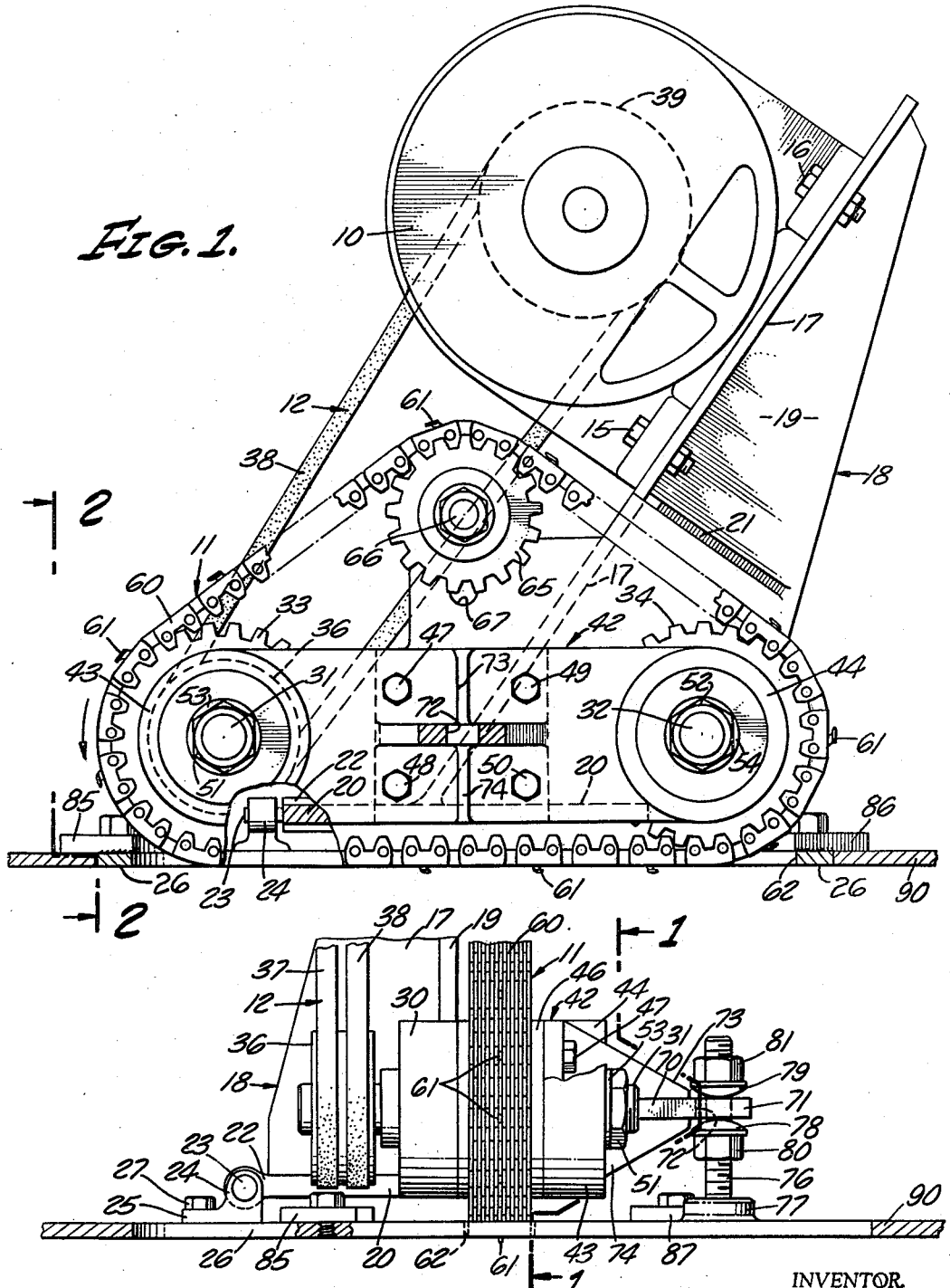
FIGURE 1 is a side elevation, partly in section, of a cutting assembly constructed in accordance with the teachings of this invention.
FIGURE 2 is a partial end view of the cutting assembly taken along the line 2—2 of FIGURE 1.

Referring now to the drawings, and particularly to FIGURES 1 and 2, a texturing machine or cutting assembly is illustrated including an electric motor 10 driving a cutting chain, generally designated by a reference numeral 11, through a V-belt drive 12. The motor 10, such as, a seven and one-half horsepower, 3600 r.p.m. motor, is mounted by means of suitable fasteners, such as bolts and nuts 15 and 16 to an end of an inclined platform member 17 of a support body, generally designated by reference numeral 18. The support body 18 may be formed in any suitable manner, such as by casting, and includes an upright rib member 19 substantially perpendicular to the inclined platform member 17, a base member 20 substantially perpendicular to the member 19, and a strut 21 generally normal to both the end of the member 17 and the member 19.

The base member 20 has an enlarged side 22 with a bore therethrough for receiving a hinge pin 23. The respective ends of the pin 23 are supported for rotatable movement in journal members, only one journal member 24 being shown for simplicity of illustration. The journal member 24 includes a flange portion 25 which is secured to a mounting plate 26, which may be circular, by means of a bolt 27. Although not shown, the mounting plate 26 may include a flange or stiffener around its periphery for adding further rigidity thereto. It will be appreciated that the other end of the pin 23 is mounted in a journal member similarly attached to the mounting plate 26. The side 22 of the base member 20, the pin 23 and the journal members provide means for enabling pivotal adjustment of the support body 18 with respect to the mounting plate 26. Initial adjustment may be provided by utilizing shims between the respective flange portions of the journal members and the mounting plate 26.

The upright rib member 19 includes journals, only one journal 30 being illustrated in the drawings, for supporting drive shafts 31 and 32. The journals may be integral with the member 19 or separate and affixed thereto as desired. The drive shafts 31 and 32 have keyed thereto respective gears 33 and 34 which may take the form of conventional timing gears. A double V-pulley 36 is keyed to an end of the shaft 31, and is driven by V-belts 37 and 38 coupled with a similar V-pulley 39 driven by the motor 10.

A cap member 42 including journals 43 and 44 similar to and corresponding with the journals on the rib member 20 is secured to an end of a spacing member 46, which extends perpendicularly from the lower end of the rib member 19, by means of suitable cap screws 47 through 50. The ends of the shafts 31 and 32 extend through the respective journals 43 and 44, and are threaded for receiving respective retainer nuts 51 and 52 and respective washers 53 and 54 for suitably rotatively mounting and retaining the shafts 31 and 32 in the respective journals. It will be appreciated that the journals in the member 20 and the journals 43 and 44 may include suitable bushings or bearings to enable free rotation of the shafts 31 and 32.

The cutting chain 11 may take the form of a conventional timing chain 60 having cutters 61 secured thereto in a suitable manner, as by welding. The chain 60 and cutters 61 extend through an aperture 62 in the plate 26. It will be noted that the cutters 61 extends below the bottom surface of the plate 26 to allow the cutters 61 to engage a surface being decorated. Preferably, the cutters 61 are fashioned from a strong material, such as carbide steel. The cutters 61 are secured in the outer face or surface of the chain 11 in a spaced apart relationship. The surface of the chain 60 to which the cutters 61 are affixed preferably is machined to provide a relatively smooth surface. All the cutters 61 on the chain 60 preferably are alike but not precisely identical, and the slight differences therein as well as slight differences in placement on the chain 60 aid in providing a decorative pattern on a material. Further pattern variations may be achieved by using a different shape cutter, for example, square, a different cutter pitch, etc. It will be appreciated that the number of cutters, and the arrangement thereof on the surface of the chain 60, also may be varied from that shown in drawings to provide an even greater variety of decorative patterns.

An idler gear 65 is rotatively mounted on a shaft 66 which is secured within a slot 67 in the rib member 19. The shaft 66 may be adjusted up or down in the slot 67 for adjusting the tension of the chain 60. A back up shoe (not shown) may be provided to engage the under-surface of the chain 60 at the aperture 62 to aid in preventing the chain from "giving" as the cutters 61 thereon engage the material being decorated.

The cap member 42 includes a horizontal flange 70 (note FIGURE 2) having a forked end 71 forming a slot 72 (see FIGURE 1). Additional structural rigidity is added to the flange 70 by upper and lower struts 73 and 74. An adjustable coupling including a stud 76 threaded into a flange 77 on the mounting plate 26 is provided for adjusting the level of the horizontal flange 70, and thus the cutting chain 11, with respect to the plate 26. The stud 76 fits into the slot 72 in the flange 70 and bushings 78 and 79 having oval surfaces engage portions of the top and bottom sides of the forked end 71 of the flange 70. Suitable adjustment is provided by means of nuts 80 and 81. Thus, the entire assembly including the support body 18, motor 10, and cutting chain 11 may be adjusted about the axis of the hinge pin 23 with respect to the mounting plate 26 by suitably positioning the nuts 80 and 81. This arrangement enables a fine depth of cut adjustment which is particularly useful when a number of cutting assemblies are positioned in an unaligned relationship for decorating a material, such as wood. That is, the different cutting assemblies may engage the material differently (i.e., one assembly cutting substantially with the grain of wood and one cutting transverse thereto) and thus the depth of cut for each assembly may be selected to compensate for the various characteristics of the material surface. Alternatively, different cutting depths for the respective assemblies may be used to enable further variations in texture.

Figure 3:
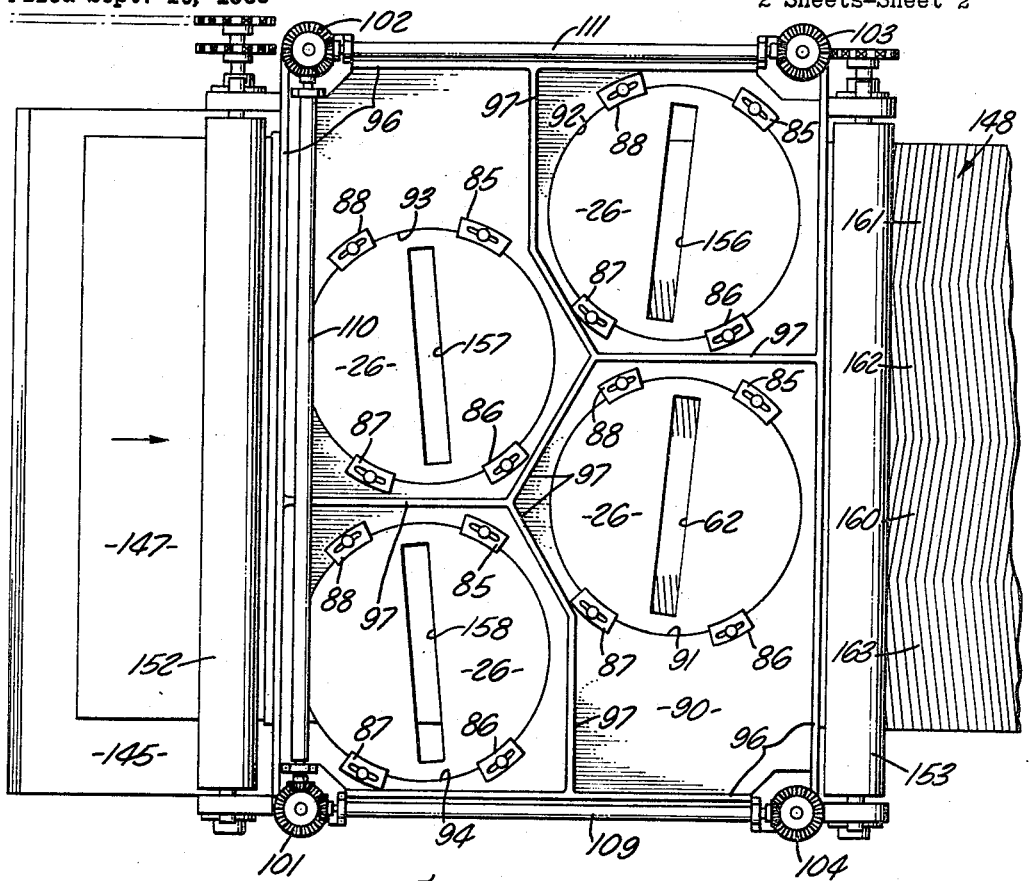
FIGURE 3 is a plan view of an apparatus constructed in accordance with the teachings of this invention which utilizes a plurality of the cutting assemblies shown in FIGURE 1 for forming a texture surface of a material.

The mounting plate 26 has a plurality of mounting brackets 85 through 88 secured thereto, as by welding, for rigidly, but adjustably, attaching the cutting assembly to a mounting platform 90 (see FIGURES 1 through 3) of the apparatus of the present invention. As best shown in FIGURE 3, the mounting platform 90 may include a plurality of circular apertures 91 through 94 for receiving the mounting plates (such as the mounting plate 26 which may be circular) of respective plural cutting assemblies. For clarity of illustration, FIGURE 3 shows only the mounting plates and mounting brackets attached thereto (and not the motor, body, cutting chain, etc.) appropriately oriented within the apertures 91 through 94 in the platform 90 and with respect to the direction of feed of material to form a desired decorative pattern thereon.

In order to provide sufficient structural rigidity for the platform 90, sides 96 and braces or struts 97 are formed thereon. As an example, the platform may be appropriately four feet (in the direction of feed) by five feet to accommodate a four foot wide wooden panel which is to be decorated. The platform 90 is mounted on a frame, generally designated by a reference numeral 100, and may be adjusted vertically. Bevel gears 101 through 104 having their respective shafts journaled (as at 105 and 106 in FIGURE 4) at the corners of the platform 90 are provided, the lower ends of which are threaded into couplings, such as couplings 107 and 108 affixed to the frame 100. The bevel gears 101 through 104 may be coupled together by shafts or pipes 109 through 111 having suitable mating bevel gears affixed to the ends thereof. The shaft of the bevel gear 104 has an end 112 adapted to receive a handle (not shown), or the like, for adjusting the platform 90 up and down by rotating the gear 104 and thus the gears 101 through 103 through the shafts 109 through 111.

Figure 4:
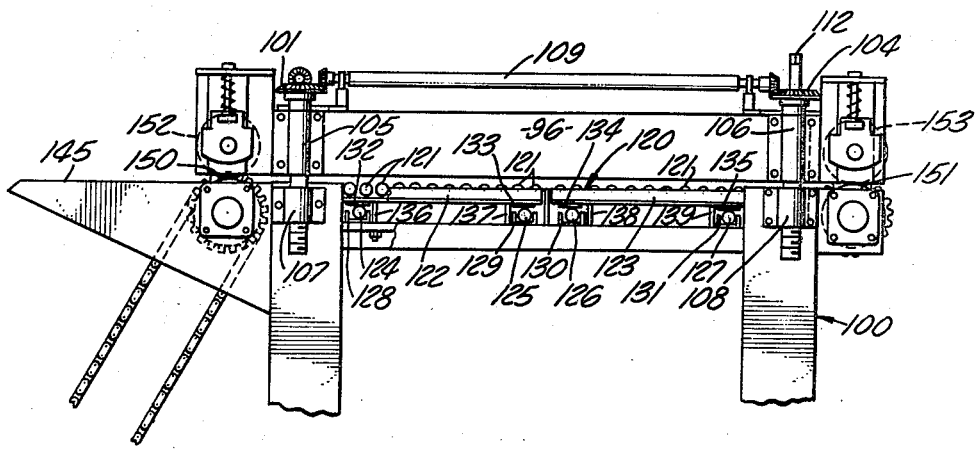
FIGURE 4 is a side elevation, partly in section, of the apparatus illustrated in FIGURE 3.

The frame 100 supports a floating platen, generally designated by reference numeral 120, which includes a plurality of rollers 121 for supporting the bottom surface of the material as it passes through the apparatus shown in FIGURES 3 and 4. The rollers 121 include shafts or pins extending from each end thereof which are supported for rotation by brackets, such as brackets 122 and 123 shown in FIGURE 4. A plurality of pneumatic supports 124 through 127, which may take the form of one and one-half inch fire hose for example, are arranged parallel with respect to the rollers 121 and supported in respective channels 128 through 131. Plates 132 through 135 are arranged above, and coextensive with the respective pneumatic supports 124 through 127 and adapted to support the lower ends of the brackets (such as the brackets 122 and 123 in FIGURE 4) for resiliently supporting these brackets and thus the rollers 121. The brackets are retained in position, but allowed to move up and down against the pneumatic supports 124 through 127, by limiting means such as bolts 136 through 139 shown in FIGURE 4. The pneumatic supports 124 through 127 may be connected to a regulated air supply for providing a desired resilience for the platen.

The entry end of the cutting assembly includes a table 145 attached to the frame 100 for supporting the material as it is fed into the cutting apparatus. A reference numeral 147 designates material (such as a four foot by six foot plywood panel) having a decorative surface 148 in the form of a herringbone pattern applied thereto. Entry and exit drive rollers 150 and 151 are suitably mounted in the frame for engaging the bottom surface of the material 147 and feeding it through the cutting apparatus. The rollers 150 and 151 may be coupled together as by a chain, and driven by a suitable drive means, such as an electric motor. Hold-down rollers 152 and 153, which may be suitably biased downwardly, engage the upper surface of the material 147 as an aid in feeding the material through the apparatus.

As can be seen from FIGURE 3, four cutting assemblies having their apertures 62, and 156 through 158 and thus their respective cutting chains, oriented as shown form the decorative surface 148 as the material 147 is fed through the cutting apparatus. Portions 160 through 163 of the decorative surface 148 are formed by the respective cutting chains of the cutting assemblies, with the assemblies having the apertures 62, 156, 157 and 158 providing the respective portions 160 through 163. It will be appreciated that the angles of cut with respect to the direction of feed of the material 147 may be adjusted to provide the desired decorative or textured surface. Adjustment is provided by means of brackets (i.e., brackets 85 through 88) affixed to the mounting plates of respective cutting assemblies and which enable the cutting assemblies to be oriented in various relationships with respect to the direction of feed of the material as well as with respect to each other. The platform may be moved up or down to provide a coarse depth of cut adjustment, and the nuts 80 and 81 may be adjusted to provide a fine depth of cut and to select different depths of cut for the respective cutting assemblies. Also, different size cutting assemblies as well as different numbers thereof, may be employed to provide an even greater range of decoration. Typical feed speed of material ranges approximately 20 to 100 feet per minute. Cutting chain speeds may vary considerably, with a range of approximately 3500 to 8000 linear feet per minute being typical. Either the feed speed or cutting chain speed, or both, may be changed to provide numerous variations in surface texture.

It will now be apparent that the present invention provides a novel method and apparatus for forming various decorative or textured surfaces on a material, such as wood. It will be understood that although exemplary embodiments of the present invention have been disclosed and discussed, other configurations, structural arrangements and applications are possible and that the embodiments disclosed may be subjected to various changes, modifications, and substitutions without necessarily departing from the spirit of the invention.

What is claimed is:

1. A method of forming a herringbone pattern on the surface of a wooden panel comprising the steps of
   positioning a first pair of cutting means with linearly movable cutting portions in generally aligned spaced but adjacent relationship,
   positioning a second pair of cutting means with linearly movable cutting portions in generally aligned spaced but adjacent relationship, the cutting portions thereof being arranged at an angle with respect to the cutting portions of said first pair of cutting means but extending in generally the same direction, with a cutting portion of a first cutting means of the second pair falling in a path overlapping both the cutting portions of said first pair, and the cutting portion of a second cutting means of said second pair falling in a path overlapping the cutting portion of a second cutting means of said first pair,
   engaging the surface of said material with said cutting portions of said cutting means, and
   moving said material transverse to the direction of linear movement of said portions.

2. Apparatus for forming a textured surface on a panel of material comprising
   a plurality of cutting assemblies, each of said cutting assemblies comprising
      cutter means for forming said textured surface, said cutter means including a chain movable in a first direction and having a substantially smooth surface with a plurality of cutters affixed to and projecting from said surface, said chain having a width transverse to said first direction substantially greater than the width of said cutters for limiting flexing of said chain in said transverse direction and for allowing said surface thereof to limit the depth of cut of said cutters,
      driving means coupled with said chain for driving said chain in said first direction, and
      supporting means coupled with said driving means for supporting said driving means to maintain a portion of said surface of said chain substantially planar and contiguous to a surface of said material,
   means for supporting said panel and for moving said material past said cutting assemblies in a second direction transverse to said first direction, and
   platform means supporting said assemblies to cut different portions of said panel.

3. Apparatus as defined in claim 2 wherein said assemblies are supported on said platform means for angular adjustment whereby to change the direction of movement of selected chains.

4. Apparatus for forming a textured surface on a panel of material comprising
   a plurality of cutting assemblies, each of said cutting assemblies comprising
      cutter means for forming said textured surface, said cutter means including a chain movable in a first direction and having a substantially smooth surface with a plurality of cutters affixed to and projecting from said surface, said chain having a width transverse to said first direction substantially greater than the width of said cutters for limiting flexing of said chain in said transverse direction and for allowing said surface thereof to limit the depth of cut of said cutters,
      driving means coupled with said chain for driving said chain in said first direction, and
      supporting means coupled with said driving means for supporting said driving means to maintain a portion of said surface of said chain substantially planar and contiguous to a surface of said material,
   means for supporting said panel and for moving said material past said cutting assemblies in a second direction transverse to said first direction, and
   platform means supporting said cutting assemblies to cut different portions of said panel, at least two of said assemblies having said portions of said chain surfaces arranged parallel and said portion of said chain surface of another assembly being arranged at an angle thereto.

5. A cutting assembly for forming a textured surface on a material comprising
   cutter means for forming said textured surface, said cutter means including a chain having an outer substantially smooth surface and an inner surface and being movable in a first direction, a plurality of cutters affixed in a substantially aligned relationship on said outer surface of said chain, said chain having a width perpendiuular to said first direction substantially greater than the width of said cutters for limiting flexing of said chain in the direction of said width and for allowing said outer surface thereof to limit the depth of cut of said cutters,
   a support body,
   driving means engaging the inner surface of said chain for driving said chain in said first direction and for maintaining at least a portion of said outer surface of said chain substantially planar, said driving means being supported by said body,
   plate means coupled with said support body and having an aperture therein through which said chain and cutters may extend for engaging said outer surface with said material, and
   means coupling said support body with said plate means for adjusting the extent to which said cutters extend through said aperture and including a hinge assembly coupled between a portion of said support body and said plate means and adjusting means coupled between said plate means and said support body for adjustably pivoting said support body about said hinge means.

References Cited

UNITED STATES PATENTS

| | | | |
|---|---|---|---|
| 3,053,130 | 9/1962 | Nitchie | 143—32 X |
| 2,556,032 | 6/1951 | Faeber | 91—50 |
| 3,234,978 | 2/1966 | Stolesen et al. | 144—136 |
| 2,918,096 | 12/1959 | Schiel | 144—134 |
| 2,916,063 | 12/1959 | Bockenkamp | 144—136 |
| 1,590,070 | 6/1926 | Bartlett | 144—123 X |
| 1,438,978 | 12/1922 | Buck | 144—123 X |

ROBERT F. BURNETT, Primary Examiner

MARK A. LITMAN, Assistant Examiner

U.S. Cl. X.R.

144—123, 136